(12) United States Patent
Ikeda et al.

(10) Patent No.: US 6,555,645 B1
(45) Date of Patent: Apr. 29, 2003

(54) DEGRADABLE POLYURETHANE RESIN

(75) Inventors: Kan Ikeda, Oomuta (JP); Hiroaki Matsuno, Tamana (JP); Naoki Sato, Omuta (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/831,408

(22) PCT Filed: Sep. 10, 1999

(86) PCT No.: PCT/JP99/04941

§ 371 (c)(1),
(2), (4) Date: May 9, 2001

(87) PCT Pub. No.: WO01/19887

PCT Pub. Date: Mar. 22, 2001

(51) Int. Cl.[7] ............................................. C08G 18/75
(52) U.S. Cl. ............................ 528/74; 528/80; 528/83; 528/84; 536/47; 536/55; 525/450
(58) Field of Search ............................ 528/74, 80, 83, 528/84; 536/47, 55; 525/450

(56) References Cited

U.S. PATENT DOCUMENTS

| | | | |
|---|---|---|---|
| 3,492,330 A | * | 1/1970 | Trecker et al. |
| 5,159,045 A | * | 10/1992 | Haseyama et al. |
| 6,156,852 A | * | 12/2000 | Asrar et al. |
| 6,350,530 B1 | * | 2/2002 | Morikawa et al. |

FOREIGN PATENT DOCUMENTS

| | | |
|---|---|---|
| DE | 19745527 | 4/1999 |
| JP | 3292320 | 12/1991 |
| JP | 03296588 | * 12/1991 |
| JP | 4189822 | 7/1992 |
| JP | 5148352 | 6/1993 |
| JP | 5295075 | 11/1993 |
| JP | 6157703 | 6/1994 |
| JP | 11263825 | 9/1999 |
| WO | WO98/55527 | 12/1998 |

* cited by examiner

*Primary Examiner*—Rachel Gorr
(74) *Attorney, Agent, or Firm*—Burns, Doane, Swecker & Mathis, LLP

(57) ABSTRACT

The invention is a degradable polyurethane resin obtained by reacting 2,5-/2,6-diisocyanatomethylbicyclo[2.2.1]heptane and/or a modified compound thereof with polyol comprising a single compound, mixture or copolycondensate selected from the group consisting of (A) polyhydroxycarboxylate polyol, (B) aliphatic polyester polyol and (C) saccharides, or (D) straight or branched polyol formed by condensation of (A) and/or (B) with aliphatic polyhydric alcohol having functionality of three or more, and the polyurethane resin has hydralyzability and biodegradability, is excellent in rigidity and elasticity in combination with flexibility as compared with conventionally known biodegradable resin, and can provide formed articles having outstandingly high elasticity and elongation and other unprecedented properties.

15 Claims, No Drawings

DEGRADABLE POLYURETHANE RESIN

TECHNICAL FIELD

The present invention relates to a novel polyurethane resin of specific structure obtained by using 2,5-/2,6-diisocyanatomethylbicyclo[2.2.1]heptane and/or a modification product thereof as a bonding agent, and more specifically relates to a novel polyurethane resin having decomposing ability, that is, hydrolyzability and biodegradability and a molded article prepared from the same.

TECHNICAL BACKGROUND

In recent years, environmental pollution due to plastic waste has become a global problem. The greatest cause of the problem lies in the fact that plastics such as polystyrene, polyvinyl chloride, and polypropylene which constitute most of the waste have no biodegradability and thus remain as intact in the soil even after land fill disposal.

When incinerated, plastics have generally large combustion heat and combustion gas causes environmental pollution. Thus, it is difficult to conform to the problem by usual incineration equipment alone. Although recycle has gradually become widespread, a considerably large portion of plastics application area is essentially inadequate for recycle.

On such present situations, development of biodegradable plastic which can decompose under natural environment, has been carried out. Many biodegradable resins have already been known. Representative resins are polyglycolic acid, polylactic acid, polyhydroxybutyric acid, polyhydroxyvaleric acid, polycaprolactone and other polyhydroxycarboxylic acids; and polybutylene succinate, polybutylene adipate and other aliphatic polyesters which can be obtained by polycondensation of polyhydric alcohols and polybasic acids. Other materials which are investigated for application are polysuccinimide and other polyamino acids; molasses, cellulose, modified cellulose, chitin, chitosan and other saccharides and modified materials thereof; resins derived from gelatin, sericin, lignin and other modified proteins; and natural high polymers from vegetable oils.

However, in order to substitute the above biodegradable resins for conventionally used resins in many application fields, physical, mechanical or chemical properties are still unsatisfactory. Particularly, polylactic acid is the sole colorless and transparent plastic in the biodegradable resins and is excellent in the tensile strength. On the other hand, polylactic acid has low elasticity and elongation and is disadvantageous in brittleness. Further, many of these plastics have difficulty in preparation and thus many improvements have been carried out.

One of these improvements is a process for reacting an aliphatic polyester oligomer with a polyisocyanate compound. For example, a process for preparing aliphatic polyester by reacting polylactide with polyisocyanate has been disclosed in Japanese Laid-Open Patent HEI 5-148352. Examples for using a polyisocyanate compound as a bonding agent of polyhydric alcohol and polybasic acid in the preparation of aliphatic polyester have been described in Japanese Laid-Open Patent HEI 4-189822 and 6-157703. Examples for bonding saccharides with polyisocyanate have been disclosed in Japanese Laid Open-Patent HEI 9-302061. However, the polyisocyanate compounds used in these patents generally have high toxicity and diamine which develops by decomposition of isocyanate is also hazardous to natural environments. Consequently, hexamethylene diisocyanate or isophorone diisocyanate which is not so hazardous to natural environments has been used in Japanese Laid Open Patent HEI 5-70543 and 5-50575. However, hexamethylene diisocyanate leads to operation difficulty due to high vapor pressure in preparing biodegradable resins, and the resulting resin is disadvantageous in low breaking strength and breaking strength, though excellent in elongation.

On the other hand, isophorone diisocyanate differs in the activity of the two isocyanate groups and has a very low reaction velocity which causes problems on preparing the biodegradable resin.

The subject of the present invention is to provide, in view of the problems in the conventional technology, a novel degradable resin having improved properties as compared with conventional biodegradable resin. Another subject of the invention is to provide a resin and a molded product thereof which can be safely abandoned in the natural environment as compared with conventional technology, can be obtained under mild reaction conditions and have decomposability, that is, hydrolyzability and biodegradability.

DISCLOSURE OF THE INVENTION

As a result of an intensive investigation in order to achieve the above subjects, the present inventors have found that a polyurethane resin obtained by using 2,5-/2,6-diisocyanatomethylbicyclo[2.2.1]heptane (hereinafter referred to simply as NBDI) which is no mutagenicity in corresponding amine as a bonding agent of the degradable resin can surprisingly enhance elongation and elasticity while maintaining or improving the strength of the known biodegradable resin and that a biodegradable polyurethane resin can be prepared under mild conditions. Thus, the present invention has been completed.

That is, the aspects of the invention can be illustrated by the following items.

(1) A degradable polyurethane resin characterized by resulting from reaction of polyol with 2,5-/2,6-diisocyanatomethylbicyclo[2.2.1]heptane represented by the formula (1);

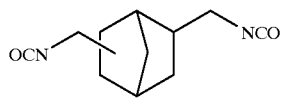

(1)

wherein the two isocyanatomethyl groups are located on 2,5-positions or 2,6-positions or a mixture thereof, and/or a modified compound thereof, wherein the polyol is a single compound or a mixture or a copolycondensate of one or more compounds selected from the group consisting of (A) polyhydroxycarboxylate polyol, (B). aliphatic polyester polyol and (C) saccharides, or (D) straight or branched polyol resulting from condensation of (A) and/or (B) with aliphatic polyhydric alcohol having functionality of three or more, (2) A degradable polyurethane resin according to the above item (1) wherein the polyhydroxycarboxylate polyol is obtained by modification of the terminal carboxyl group to a hydroxyl group in the aliphatic polyhydroxycarboxylic acid represented by the formula (2);

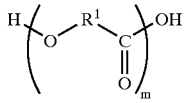

(2)

wherein $R^1$ is an alkylene group having 1 to 4 carbon atoms in the straight chain portion and having 1 to 6 total carbon atoms which include branched alkyl groups, and m is an integer of 1 or more.

(3) A degradable polyurethane resin according to the above item (2) wherein $R^1$ in the formula (2) is an alkylene having 1 carbon atom, alkylene having 1 carbon atom in the straight chain portion and substituted by methyl, ethyl or propyl, or having 2 carbon atoms in the straight chain portion and substituted by methyl or ethyl, or having 3 carbon atoms in the straight chain portion and substituted by methyl, and $R^1$ in the formula (2) is aliphatic polyhydroxycarboxylate polyol comprising the same or different structural units, (4) A degradable polyurethane resin according to the above item (1) wherein aliphatic polyester polyol is obtained by reacting a single compound or mixture selected from aliphatic polyhydric alcohol represented by the formula (3);

$$HO\text{—}R^2\text{—}OH \quad (3)$$

wherein $R^2$ is an unsubstituted or substituted aliphatic hydrocarbon group having 2 to 20 carbon atoms, with a single compound or mixture selected from aliphatic polybasic acid represented by the formula (4);

$$HOOC\text{—}R^3\text{—}COOH \quad (4)$$

wherein $R^3$ is an unsubstituted or substituted aliphatic hydrocarbon group having 2 to 20 carbon atoms, (5) A degradable polyurethane resin according to the above item (1) wherein saccharides are a single compound or mixture selected from monosaccharide, molasses, cellulose or cellulose derivative.

(6) A degradable polyurethane resin according to the above item (1) wherein the aliphatic polyhydric alcohol having three or more functionality is a single compound or mixture selected from the compounds represented by the formula (5);

$$R^4(OH)_n \quad (5)$$

wherein $R^4$ is a hydrocarbon group having 1 to 20 carbon atoms and n is an integer of 3 to 6.

(7) A degradable polyurethane resin according to the above item (1) wherein the polyol has acidity of $10^{-4}$ mol/g or less.

(8) A degradable polyurethane resin according to the above item (1) wherein the modified compound of 2,5-/2,6-diisocyanatomethylbicyclo[2.2.1]heptane is a single compound or a mixture selected from the group consisting of isocyanurate derivative of 2,5 and/or 2,6-diisocyanatomethylbicyclo[2.2.1]heptane represented by the formula (6);

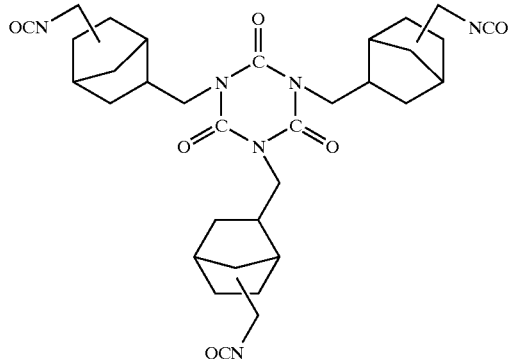

(6)

or a blocked compound thereof, uretidione derivative of 2,5- and/or 2,6-diisocyanatomethylbicyclo[2.2.1]heptane represented by the formula(7);

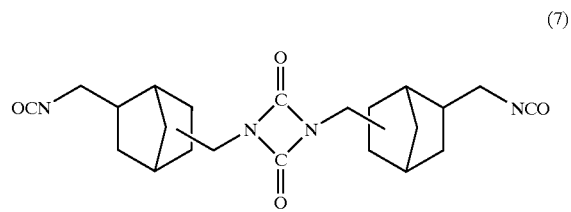

(7)

or a blocked compound thereof, biuret derivative of 2,5- and/or 2,6-diisocyanatomethylbicyclo[2.2.1]heptane representd by the formula(8);

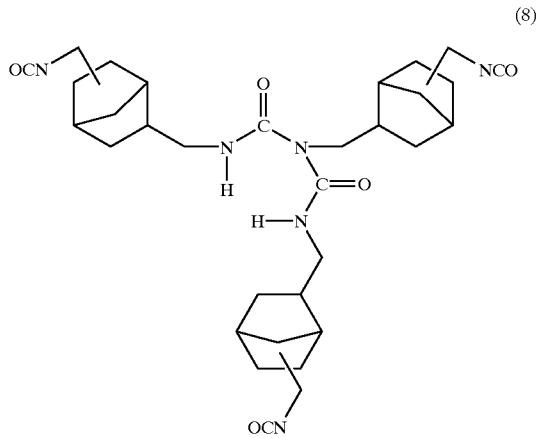

(8)

or a blocked compound thereof, trimethylolpropane adduct of 2,5- and/or 2,6-diisocyanatomethylbicyclo[2.2.1]heptane represented by the formula (9);

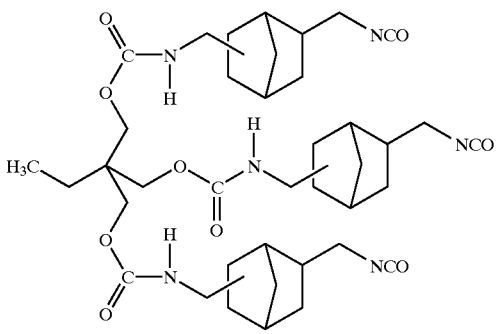

(9)

or a blocked compound thereof, and polycarbodiimide derivative of 2,5- and/or 2,6-diisocyanatomethylbicyclo[2.2.1]heptane represented by the, formula (10);

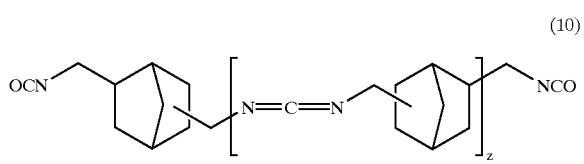

(10)

wherein Z is an integer of 1 or more.

(9) A degradable polyurethane resin according to the above item (1) wherein 2,5-/2,6-diisocyanatomethylbicyclo[2.2.1]heptane and/or a modified compound thereof are used in an amount of 0.001 to 40% by weight for polyol.

(10) A hydrolyzable polyurethane resin according to one of the above items (1) to (9).

(11) A biodegradable polyurethane resin according to one of the above items (1) to (9).

(12) A raw material composition of degradable polyurethane resin characterized by comprising the polyol in the above item (1) and 2,5-/2,6-diisocyanatomethylbicyclo[2.2.1]heptane and/or a modified compound thereof.

(13) A polymer film characterized by forming the degradable polyurethane resin of the above item (1).

(14) A polymer sheet characterized by forming the degradable polyurethane resin of the above item (1).

(15) A base material for disk case characterized by molding the degradable polyurethane resin of the above item (1).

(16) A polymer staple characterized by forming the degradable polyurethane resin of the above item (1).

(17) A card base characterized by molding the degradable polyurethane resin of the above item (1).

BEST MODE OF CARRYING OUT THE INVENTION

Hereinafter, the present invention is illustrated in detail.

The present invention is a degradable polyurethane resin obtained by reacting 2,5/2,6-diisocyanatomethylbicyclo[2.2.1]heptane and/or a modified compound thereof with a single compound, mixture or copolycondensate of polyol which is selected from the group consisting of (A) polyhydroxycarboxylate polyol, (B) aliphatic polyester polyol and (C) saccharide, or (D) straight or branched polyol which is obtained by condensation of (A) and/or (B) with tri or more functional aliphatic polyhydric alcohol.

The degradable polyurethane resin of the invention (hereinafter referred to simply as polyurethane resin of the invention) has hydrolyzablility and biodegradability. That is, the polyurethane resin of the invention has property for causing hydrolysis in the presence of acid or alkali and also hydrolyzes by hydrolase of microorganisms under natural environment, that is, so called biodegradability.

Consequently, after using for the desired object, for example, molded articles, the polyurethane resin of the invention can be destructed by hydrolysis or subjected to recycled use and does not impair global environment, even though abandoned in the natural environment. The resin also has good strength, elongation and elasticity in addition to such degradability.

The polyol of the invention is a single compound, mixture or copolycondensate which is selected from the group consisting of (A) polyhydroxycarboxylate polyol, (B) aliphatic polyester polyol and (C) saccharides, or (D) straight or branched polyol resulting from condensation of (A) and/or (B) with aliphatic polyhydric alcohol having functionality of three or more.

In these polyols, (A) polyhydroxycarboxylate polyol is referred to as an oligomer and/or polymer obtained from aliphatic hydroxycarboxylic acid and the terminal carboxyl group is modified to a hydroxyl group.

That is, (A) polyhydroxycarboxylate polyol of the invention is oligomer and/or polymer of aliphatic hydroxycarboxylic acid represented by the formula (2);

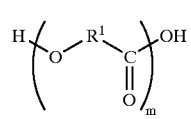

(2)

wherein $R^1$ is an alkylene group having 1 to 4 carbon atoms in the straight chain portion and having 1 to 6 total carbon atoms which include branched alkyl groups, and m is an integer 1 or more, and the terminal carboxyl group is modified to a hydroxyl group, and includes, for example, a compound represented by the formula(2-1) or formula(2-2);

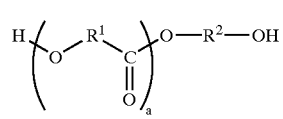

(2-1)

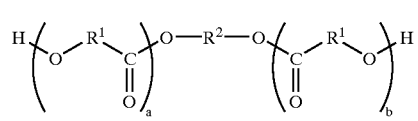

(2-2)

wherein $R^1$ is an alkylene group having 1 to 4 carbon atoms in the straight chain portion and having 1 to 6 total carbon atoms which include branched alkyl groups, $R^2$ is an unsubstituted or substituted aliphatic alkyl group having 2 to 20 carbon atoms, and a and b are integers of 1 or more.

In the formula (2), (2-1) and (2-2), $R^1$ is more specifically an alkylene having one carbon atom: alkylene having one carbon atom in the straight chain portion and substituted by methyl, ethyl or propyl; alkylene having two carbon atoms in the straight chain portion and substituted by methyl or ethyl; or alkylene having three carbon atoms in the straight chain portion and substituted by methyl. When m is an integer of 2 or more, $R^1$ can consist of the same or different structural units.

Specific examples of aliphatic hydroxy carboxylic acid used for preparing the oligomer or polymer represented by the formula (2) include, for example, glycolic, lactic, 2-hydroxybutyric, 3-hydroxybutyric, 4-hydroxybutyric, 2-hydroxyvaleric, 3-hydroxyvaleric, 4-hydroxyvaleric, 2-hydroxyhexanic, 2-hydroxyheptanic, 2-hydroxyoctanic, 2-hydroxy-2-methyl-butyric, 2-hydroxy-2-ethylbutyric, 2-hydroxy2-methylvaleric, 2-hydroxy-2-ethylvaleric, 2-hydroxy-2-butylvaleric, 2-hydroxy-2-methylhexanic, 2-hydroxy-2-ethylhexanic, 2-hydroxy-2-propylhexanic, 2-hydroxy-2-butylhexanic, 2-hydroxy-2-pentylhexanic, 2-hydroxy-2-methylheptanic, 2-hydroxy-2-ethylheptanic, 2-hydroxy-2-propylheptanic, 2-hydroxy-2-butylheptanic, 2-hydroxy-2-pentylheptanic, 2-hydroxy-2-hexylheptanic, 2-hydroxy-2-met.hyloctanic, 2-hydroxy-2-ethyloctanic, 2-hydroxy-2-propyloctanic, 2-hydroxy-2-butyloctanic, 2-hydroxy-2-pentyloctanic, 2-hydroxy-2-hexyloctanic, 2-hydroxy-2-heptyloctanic, 5-hydroxy-5-propyloctanic, 6-hydroxycaproic, 6-hydroxyheptanic, 6-hydroxyoctanic, 6-hydroxy-6-methylheptanic, 6-hydroxy-6-methyloctanic, 6-hydroxy-6-ethyloctanic, 7-hydroxyheptanic, 7-hydroxyoctanic, 7-hydroxy-7-methyloctanic and 8-hydroxyoctanic acid.

In these acids, glycolic, lactic, 2-hydroxbutyric, 3-hydroxybutyric, 3-hydroxyvaleric and 4-hydroxyvaleric acid are preferred in view of providing biodegradable polyurethane resin having high strength. Lactic acid is most preferred because resulting biodegradable resin has particularly high strength, is transparent and further has fungus resistance.

The hydroxycarboxylic acid which can be used in the invention is not limited to the above exemplified compounds and can be used singly or as a mixture for preparing the polymer.

These hydroxycarboxylic acids can also be derived from lactones such as γ-butyrolactone which is formed by intermolecular dehydration-cyclization or from dimers such as glycolide and lactide. No particular restriction is imposed upon the ratio of optical isomers.

(B) Aliphatic polyester polyol in the invention can be obtained by polycondensation of aliphatic polyhydric alcohol with polybasic acid. Aliphatic polyhydric alcohol used for the raw material is, for example, glycols represented by the formula (3):

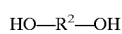   (3)

wherein $R^2$ is an unsubstituted or substituted hydrocarbon group having 2 to 20 carbon atoms. Specific glycols include, for example, ethyleneglycol, diethyleneglycol, triethyleneglycol, propyleneglycol, dipropyleneglycol, 1,3-butanediol, 1,4-butanediol, 3-methyl-1,5-pentanediol, 1,6-hexanediol, 1,9-nonanediol, neopentylglycol, polytetramethyleneglycol and 1,4-cyclohexanedimethanol. In these glycols, ethyleneglycol, 1,4-butanediol and 1,4-cyclohexane dimethanol are preferred in view of availability and ease handling. However, no particular limitation is imposed upon the raw materials other than these exemplified compounds so long as these materials can form aliphatic polyester. Other polyhydric alcohols can also be used.

Aliphatic polybasic acid used for the raw material is represented by the formula (4);

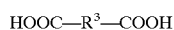   (4)

wherein $R^3$ is an unsubstituted or substituted aliphatic hydrocarbon group having 2 to 20 carbon atoms. Representative aliphatic polybasic acids include, for example, oxalic, succinic, malonic, glutaric, adipic, pimelic, suberic, azelaic, sebacic, undecanedioic, dodecanedioic, maleic and fumaric acid. These acids can be used singly or as a mixture.

Anhydride or ester of these acids can also be used. No particular restriction is imposed upon the raw materials of acid component other than these exemplified components so long as these component materials can form aliphatic polyester.

(C) Saccharides of the invention are monosaccharide, disaccharide, oligosaccharide, polysaccharide and/or derivative and modified compounds thereof. Specific compounds of monosaccharide include, for example, erythrose, threose, ribose, arabinose, xylose, lyxose, allose, altrose, glucose, mannose, gulose, idose, galactose, talose, fructose, glucopyranose, glucofuranose, galactfuranose, arabinopyranose, fructopyranose, 2-deoxyribose, xylulose, ribulose, sedoheptulose, rhamnose, fucose, glucosamine and galactosamine.

Any ratio can be permitted on the optical isomer content. Disaccharide and polysaccharide consisting of the same or different monosaccharide, enolated saccharide, oxidized saccharide, reduced saccharide, glucoside and other modified saccharides, or mixtures of these materials and molasses can also be used. Saccharides which can be used in the invention of course include cellulose which is obtained by forming a long chain of saccharides, that is, cellulose nitrate, cellulose acetate, ethylcellulose, celluloid viscose rayon, regenerated cellulose, cellophane, cupra, cupraammonium rayon, cuprophane, bemberg, hemicellulose, starch, gum arabic, guano gum, loucastbean gum, acecia gum, chitin, chitose and modified material thereof. No particular restriction is imposed so long as the saccharides can be used as polyol.

The above (A) to (C) polyols can also be used for the invention after adjusting the species and amount of functional groups.

That is, the functional groups are modified by reacting with other hydroxyl compound, carboxylic acid or amino compound and thus modified polyol can be used for the invention.

For example, a terminal hydroxyl or carboxyl group of aliphatic polyhydroxycarboxylic acid or aliphatic polyester can be converted to substantially hydroxyl group alone by previously reacting with polyhydric alcohol, polybasic acid or polyamine, or can also be reacted, when necessary, with a compound having a functional group other than a hydroxyl group. Further, when saccharides are used, a new polyol can be prepared by mixing or reacting saccharides with other polyols. For example, molasses polyol can be prepared by mixing or reacting molasses with polyols.

When polyol is (A) aliphatic polycarboxylate polyol in particular, terminal groups of hydroxycarboxylic acid or polyhydroxycarboxylic acid are desired to substantially convert to hydroxyl groups by reacting with one or more species selected from the group consisting of polyhydric alcohol, (B) aliphatic polyesterpolyol and saccharides.

The oligomer and/or polymer of (B) aliphatic polyester polyol obtained by polycondensation of aliphatic polyhydric alcohol and aliphatic polybasic acid is desired to substantially terminate the polymer chain with hydroxyl groups by controlling the mole ratio of aliphatic polyhydric alcohol to aliphatic polybasic acid.

The polyol which is substantially terminated by hydroxyl groups is referred to polyol having satisfactory hydroxyl groups to form polyurethane resin by reacting with NBDI. The polyol has an acid value of preferably $10^{-4}$ mol/g or less, more preferably $6 \times 10^{-5}$ mol/g or less by neutralization titration with sodium methylate. As to the hydroxyl value, an average number of hydroxyl group per mole of polyol is generally 1.5 or more, preferably 1.8 or more, more preferably 1.9 or more, most preferably 2.0 or more.

When controlling the hydroxyl number at the polymer chain end polyol having a straight molecular structure can be converted to a branched molecular structure by reaction with aliphatic three or more functional, aliphatic polyhydric alcohol represented by the formula (5):

$$R^4(OH)_n \quad (5)$$

wherein $R^4$ is a hydrocarbon group having 1 to 20 carbon atoms and n is an integer of 3 to 6. The aliphatic polyhydric alcohol can be used singly or as a mixture.

Specifically, polyols having a branched structure can be obtained by condensation with glycerol, pentaerythritol, trimethylolpropane, trimethylolethane, trimethylolheptane, 1,2,4-butanetriol, 1,2,6-hexanetriol or saccharides, on or after preparing aliphatic polyester polyol by polycondensation of aliphatic polyhydroxycarboxylate polyol or aliphatic polyhydric alcohol with polybasic acid.

The molecular weight of polyol used in the invention can be controlled by converting high molecular weight to low molecular weight or vice versa. For example, polyhydroxycarboxylic acids or other aliphatic polyesters can be further polymerized to increase molecular weight or high molecular weight cellulose can be decomposed to use as a low molecular weight oligomer.

The molecular weight of polyol used can be changed corresponding to various uses and thus is not limited in particular. The number average molecular weight is usually in the range of 200 to 100,000. As to polysaccharides, higher molecular weight is often used.

In order to obtain biodegradable polyurethane resin having still higher strength, the weight average molecular weight of aliphatic polyhydroxycarboxylate polyol and aliphatic polyesterpolyol is in the range of preferably 500 to 100,000, more preferably 1,000 to 50,000, most preferably 5,000 to 40,000. When the weight average molecular weight exceeds 100,000, the amount of NBDI required for the reaction becomes very small and thus effect of NBDI is reduced.

The isocyanate compound of the invention is NBDI represented by the formula (1):

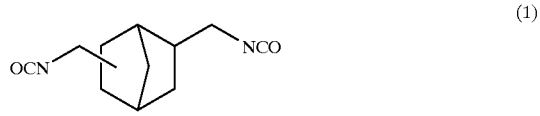

wherein the two isocyanatomethyl groups are located on 2,5-positions or 2,6-positions or a mixture thereof, and/or a modified compound thereof. The modified compound which is preferred in view of preparation and availability with ease includes, for example, isocyanurate compound of NBDI represented by the formula (6):

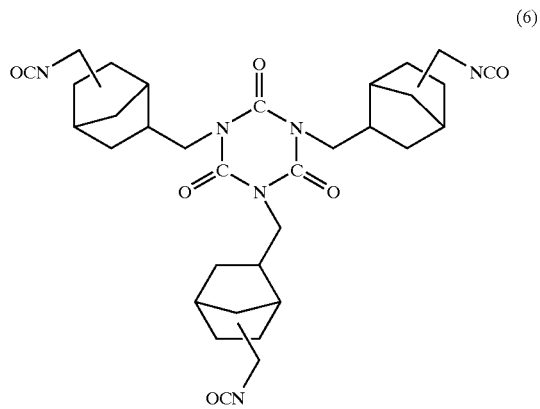

or a blocked compound thereof, uretidione compound of NBDI represented by the formula(7):

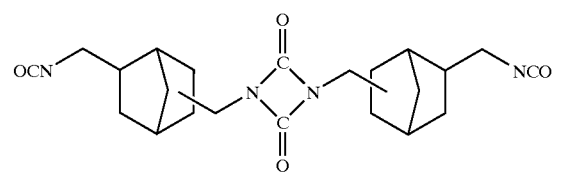

or a blocked compound thereof, biuret compound of NBDI represented by the formula(8):

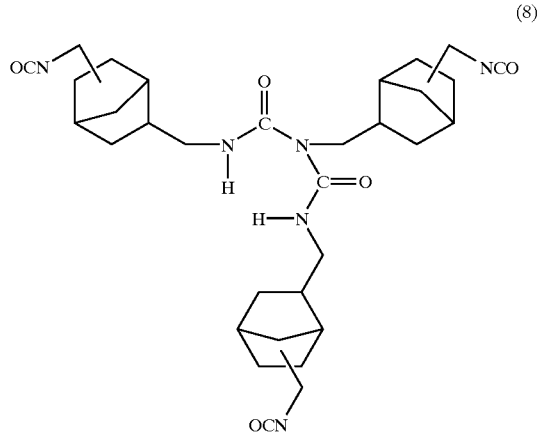

or a blocked compound thereof, trimethylolpropane adduct compound of NBDI represented by the formula (9):

(9)

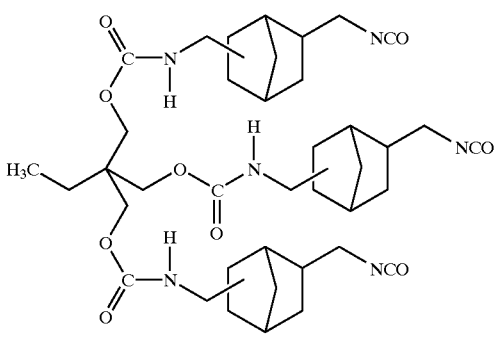

or a blocked compound thereof, and polycarbodiimide compound of NBDI represented by the formula (10):

(10)

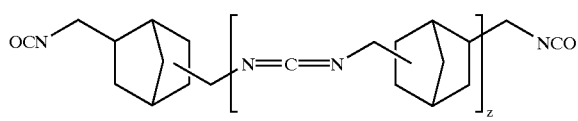

wherein Z is an integer of 1 or more, or a blocked compound thereof.

The isocyanate compounds which can be used in the invention are not limited to these compounds and can be used singly or as a mixture.

In the invention, the desired polyurethane resin can be obtained by reaction of the above polyol with NBDI. However, no particular restriction is imposed upon the reaction process.

The reaction can be carried out in the presence or absence of solvent and catalyst. There reaction temperature can be adequately and arbitrarily controlled depending upon the properties of polyol for use and resulting polyurethane resin.

The amount of NBDI in the reaction can be altered depending upon the molecular weight of polyol, numbers of functional groups on the terminal of polyol and desired properties, and is usually 0.001 to 40% by weight, preferably 0.01 to 25% by weight, more preferably 0.01 to 10% by weight, most preferably 0.01 to 5% by weight for the total amount of raw materials used in the reaction. When the amount exceeds 40% by weight, characteristics of polyol can not be fully exhibited. On the other hand, the amount less than 0.001% by weight almost eliminates the effect of reacting with NBDI.

Solvents which can be used in the invention includes, for example, water, benzene, toluene, xylene, mesitylene, chlorobenzene, o-dichlorobenzene, methylene chloride, chloroform, carbon tetrachloride, dichloroethane, trichloroethane, trichloroethylene, tetrachloroethane, tetrachloroethylene, tetrahydrofuran, 1,4-dioxane, N,N-dimethylformamide, N,N-dimethylacetamide, N-methyl-2-pyrrolidone, 1,3-dimethyl-2-imidazolidinone, dimethylsulfoxide and sulfolane.

When urethane catalyst is used, specific examples of the catalyst are dibutyltin dilaurate, tetramethylbutanediamine, 1,4-diaza[2.2.2]bicyclooctane, stannous octoate, 4-methylmorpholine and triethylamine. The amount of urethane catalyst is similar to the case of known urethane reactions.

The reaction temperature depends upon the polyol used and species of formed polyurethane resin. The reaction is usually carried out in the molten state without solvent in the temperature range of 60 to 250° C. In the presence of the solvent, the reaction is usually carried out in the range from room temperature to the boiling point of the solvent.

In the invention, a prepolymer substantially terminated by isocyanate groups is prepared by reacting polyol with NBDI, and the reaction can be further carried out to obtain degradable polyurethane resin. For example, a substantially isocyanate terminated prepolymer is obtained by reacting NBDI with aliphatic polyesterpolyol of straight polymer chain, and thereafter the prepolymer can be converted to polyurethane foam in the presence of water or to biodegradable polycarbodiimide in the presence of carbodiimide catalyst and further to degradable or biodegradable polyurethane foam.

Thus obtained polyurethane resin of the invention has urethane linkage formed by reaction of the above polyol and NBDI, and the resin structure has additional linkages, for example, urea, amide, carbodumide, allophanate, biuret, isocyanurate, urethonimine and imide linkage. The presence of these linkages can be arbitrarily selected on the basis of species of NBDI and/or modified compound thereof, species of functional group of the above polyol and reaction conditions.

For example, in order to obtain degradable and biodegradable polyurethane resin having an isocyanurate linkage, isocyanurate of NBDI is used as a raw material, or functional groups on the terminal are previously converted to isocyanate groups by reacting polyol with NBDI and the resulting prepolymer is successively reacted in the presence of isocyanurate catalyst to form degradable and biodegradable polyurethane resin having an isocyanurate linkage.

The degradable polyurethane resin particularly obtained in the invention is also an excellent biodegradable resin having high elasticity and flexibility together with stiffness which is absent in the conventional biodegradable resin. Specific linkages such as carbodiimide or imide can provide resistance to heat and chemicals and thus the degradable and biodegradable resin can develop new uses.

The term "degradability" which is an excellent property of polyurethane resin in the invention is referred to a phenomenon which hydrolyzes by aqueous acid or alkali solution and becomes soluble in water. For example, a powdered resin decomposes into a water soluble state in an aqueous alkali solution having a sufficient alkali content at temperature in the range of room temperature to 100° C. within 72 hours, preferably within 24 hours, more preferably within 5 hours. Sufficient alkali content is usually more than mole numbers of structural units in the resin.

The term "biodegradability" is referred to a phenomenon which hydrolyzes to water and carbon dioxide by the catalytic action of hydrolase of microorganisms under natural environment.

The reaction velocity of NBDI and/or modified compound thereof is very high as compared with that of isophorone diisocyanate, which reduces operation load in the production step and thus the polyurethane resin obtained is excellent in industry.

The polyurethane resin of the invention is a biodegradable resin having elasticity and flexibility together with stiffness, and can be applied to various uses. The uses are, for example, polymer film, polymer sheet, tube, foam, filament and other articles obtained by common processing method, short fiber, long fiber, nonwoven fabric, porous substrate, defecation bag, garbage bag, sand bag, heat insulating case, food tray, wrapping film, chopsticks, spoon, fork, cup, sponge, bottle, water absorption sheet, moisture retention sheet, agricultural mulching film, disc-case substrate, polymer staple, card base, blister package, tobacco filter, paper coating agent, laminate, lacrimatomic antitussive rod, microcapsule for heat-sensitive paper and pressure sensitive paper, microcapsule for medicine, slow release medicine, microcapsule for fertilizer and soil improver, suture, suture clip, injection syringe, disposable cloth, surgical apparatus, complex semipermeable membrane, fracture therapeutic supporter, bone conjugator, grafting apparatus, implant, fishline, fishing net, fishing lure, bone pot, nail polisher, bathing pumice, horticultural implement, antibromic microcapsule or container or package, microcapsule or container or package of fragrant substance, shrink film for label, adhesive, hot-melt adhesive, container for recovered waste paper, package band, adhesive tape, cushioning material, coin-packing film, masking film for coating and spectacle frame. For these uses, the polyurethane resin of the invention can be widely applied by utilizing excellent properties such as degradability, biodegradability in particular.

Particularly, the biodegradable resin obtained by the reaction of aliphatic polyhydroxy carboxylic acid and NBDI has stiffness and transparency and thus is excellent for the material of packaging polymer film, polymer sheet, disc-case substrate and card base. The polyurethane resin is also suited for fashion textiles and nonwoven fabric due to its elegant feeling as a cloth.

Preparation process of polymer film, polymer sheet, disc-case substrate and card base includes, for example, solution casting and calendaring. When solution casting is carried out, solvents which can be used are, for example, chloroform, methylene chloride, benzene, acetonitrile, acetone, toluene, xylene, N,N-dimethylformamide, dimethyl sulfoxide, 1-methyl-2-pyrrolidone, and 1,3-dimethyl-2-imidazolidinone. The solution obtained is cast on a flat, smooth surface and the solvent is removed.

When melt extrusion process is carried out, a known T-die method or inflation method is applied. No particular limitation is imposed upon the extrusion temperature because melting temperature differs depending upon the species of resin prepared. The temperature range is usually 100 to 280° C., when the forming temperature is low, stability of forming process is difficult to obtain and overloading is liable to occur. On the other hand, high forming temperature tends to generate polymer decomposition and results in molecular weight reduction, strength lowering and coloration.

Polymer film or polymer sheet of the invention can be stretched or unstretched. In order to improve stiffness, fabrication ability, mechanical strength, hardness, impact strength, dimensional stability and flexural strength, the resulting film or sheet is preferably subjected to monoaxial or biaxial stretching. When monoaxial stretching is carried out, the film or sheet is usually stretched 1.1 to 5 times to the longitudinal or transverse direction. When biaxial stretching is carried out, stretching on the first axis and the second axis can be carried out simultaneously or successively.

The stretching temperature differs depending upon the structure and constitution of polyurethane resin used, and is preferably in the range between the glass transition temperature Tg of the polyurethane resin and Tg+50° C. When the stretching temperature is higher than this range, strength improvement due to stretching cannot be observed.

The formed product obtained can also be heat-treated after forming at temperature from Tg to lower than melting point. Heat treatment is usually carried out for 1 second to 30 minutes.

When the polyurethane resin of the invention is processed to form articles, the resin can also be used as a mixture or complex with other resin. In order to improve properties, light stabilizer, plasticizer, antioxidant, heat stabilizer, filler, coloring inhibitor, pigment and other additives can be used.

Thus, the polyurethane resin of the invention and formed articles thereof can be obtained. The formed articles have hydrolyzability and thus, after using for the desired object. These articles can be hydrolyzed in an aqueous acid or alkali solution, or biodegraded by the action of microorganisms under natural environment.

The biodegradable resin in the invention is primarily referred to a compostable resin, for example, which has a carbon dioxide decomposition degree of 60% or more for the period of 3 months in the biodegradability test in accordance with ISO/CD 14855. The resin which has a decomposition degree of less than 60% has poor biodegradability and causes problems when disposed as wastes or released into the natural environment in the course of composting.

The raw material composition of degradable polyurethane resin in the invention comprises the above (1) polyol and NBDI and/or a modified compound thereof and can be converted to the polyurethane resin of the invention by temperature rise or addition of catalyst or other reaction initiators.

The composition comprises, for 100 parts by weight of the above (1) (A) to (D) polyol, NBDI and/or modified compound thereof in an amount of 0.001 to 70 parts by weight, preferably 0.01 to 30 parts by weight, more preferably 0.01 to 10 parts by weight, and also comprises aliphatic polyhydric alcohol, preferably biodegradable polyhydric alcohol in an amount of 0 to 1,000 parts by weight, preferably 0 to 300 parts by weight, more preferably 0 to 100 parts by weight. Further, the composition can also comprise catalyst, water or other foaming agent, light stabilizer, plasticizer, antioxidant, heat stabilizer, filler, coloring inhibitor, pigment and other additives. Aliphatic polyhydric alcohol can be present or absent in the composition. When the amount exceeds 50 parts by weight or more, in particular, the aliphatic polyhydric alcohol preferably has biodegradability.

EXAMPLE

The invention will hereinafter be illustrated further in detail by way of examples and comparative examples. However, these examples do not limit the scope of the invention.

Hydroxyl Value

Measured in accordance with JIS K-0070 and shown by mol/g unit.

Weight Average Molecular Weight

Measured by GPC in chloroform solution depending upon species and molecular weight of polymer.

Acid Value and Number Average Molecular Weight

Measured by automatically titrating with a N/100-sodium methylate/methanol solution in a solution of methylene chloride/methanol=7/3 by volume and calculated numbers of terminal carboxylic acid.

Synthesis Example 1

Preparation of Polylactic Acid Modified Polyesterpolyol (a) to (d)

After nitrogen-purging a 1 liter five necked flask equipped with a stirrer, thermometer, condenser and nitrogen inlet tube, 100.0 g (0.0862 mol as carboxyl group) of high molecular polylactic acid obtained by self-dehydration condensation and having a weight average molecular weight of 3,000 and number average molecular weight of 1,160, and 300 g of methylene chloride were charged, successively 17.48 g (0.103 mol) of 2-chloro-1,3-dimethylimidezolidinium chloride (hereinafter referred to simply as DMC), 9.01 g(0.10 mol) of 1,4-butanediol and 24.12 g (0.259 mol) of β-picoline were added, and reacted by stirring at 30 to 40° C. for 3 hours. After finishing the reaction, the reaction mixture was successively washed with a 30% aqueous hydrogen chloride solution and water. Thereafter methylene chloride was removed by warming under reduced pressure to obtain 105.3 g of polylactic acid modified polyesterdiol. The yield was 100%. Polylactic acid modified polyesterdiol(a) thus obtained had a weight average molecular weight of 3,000 by GPC, acid value of $1.17 \times 10^{-5}$ mol/g, and hydroxyl value of $1.92 \times 10^{-3}$ mol/g. The amount of 1,4-butanediol was changed to 0.060 mol, 0.030 mol and 0.015 mol and the amounts of DMC and β-picoline were correspondingly varied to obtain polylactic acid modified polyesterdiols having a weight average molecular weight of 5,000 (polyester-polyol(b)), 10,000 (polyesterpolyol (c)), and 20,000(polyesterpolyol(d)), respectively. Polylactic acid modified polyesterdiols thus obtained had an acid value of $1.42 \times 10^{-5}$, $1.33 \times 10^{-5}$ and $1.14 \times 10^{-5}$ mol/g, respectively and hydroxyl value of $1.21 \times 10^{-3}$, $6.02 \times 10^{-4}$ and $2.99 \times 10^{-4}$ mol/g, respectively.

Synthesis Example 2

Preparation of Polylactic Acid Modified Polyesterpolyol (e) to (h)

After nitrogen-purging a 1 liter five necked flask equipped with a stirrer, thermometer, condenser and nitrogen inlet tube, 100.0 g (0.0862 mol as carboxyl group) of high molecular polylactic acid obtained by self-dehydration condensation and having a weight average molecular weight of 3,000 and number average molecular weight of 1,160, and 300 g of methylene chloride were charged, successively 17.48 g (0.103 mol) of DMC, 5.59 g of ethylene glycol and 0.91 g of pentaerythritol (the mol ratio of ethylene glycol to pentaerythritol was 9:0.67) and 24.12 g (0.259 mol) of β-picoline were added, and reacted by stirring at 30 to 40° C. for 3 hours. After finishing the reaction, the reaction mixture was successively washed with a 30% aqueous hydrogen chloride solution and water. Thereafter methylene chloride was removed by warming under reduced pressure to obtain 104.9 g of polylactic acid modified polyesterdiol. The yield was 100%. Polylactic acid modified polyesterpolyol(e) thus obtained had a weight average molecular weight of 3,000 by GPC, acid value of $1.18 \times 10^{-5}$ mol/g, and hydroxyl value of $1.88 \times 10^{-3}$ mol/g. Polylactic acid modified polyesterdiol having an weight average molecular weight of 5,000(f), 10,000(g) and 20,000(h), respectively were prepared on the basis of the same mol ratio except that total mol ratio of ethylene glycol and pentaerythritol was varied to 0.0580 mol, 0.0290 mol and 0.0145 mol, respectively.

Polylactic acid modified polyesterdiol thus obtained had a hydroxyl value of $1.21 \times 10^{-3}$, $6.11 \times 10^{-4}$ and $3.06 \times 10^{-4}$ mol/g, respectively.

Synthesis Example 3

Preparation of Succinic Acid-base Polyester (i)

To a 3 liter separable flask equipped with a stirrer, fractionating condenser, thermometer and nitrogen inlet tube, 750 g of 1,4-butanediol, 885 g of succinic acid and 1.6 g of tetraisopropyl titanate were charged, esterified in a nitrogen stream at 195 to 200° C., and finally a deglycolation reaction was carried out at 210 to 215° C. for 6 hours under reduced pressure of 0.6 torr. As a result, succinic acid-base polyester (i) having an weight average molecular weight of 17,000 was obtained. Polyester (i) was cooled to room temperature and solidified to white wax having a melting point of 110 to 115° C.

Preparation of Adipic Acid-base Polyester(j)

To the same flask as used for the above succinic acid-base polyester, 750 g of 1,4-butanediol, 1,095 g of adipic acid and 1.8 g of tetraisopropyl titanate were charged and esterified at 190 to 200° C. for 6 hours under nitrogen atmosphere and thereafter deglycolation reaction was carried out at 205 to 210° C. for 7 hours finally under reduced pressure of 0.5 torr. As a result, adipic acid-base polyester (j) having a weight average molecular weight of 15,000 was obtained. Polyester (j) was cooled to room temperature and solidified to faint yellow wax having melting point of 58° C.

Synthesis Example 4

Preparation of Polylactic Acid Modified Polyesterdiol (k) to (m)

After dissolving 100.0 g (0.0862 mol as carboxyl group) of polylactic acid oligomer which had a weight average molecular weight of 3,000 and was used in Synthesis Example 1 into 300 g of methylene chloride at 40° C., 0.90 g (0.01 mol) of 1,4-butanediol 17.48 g (0.103 mol) of DMC and 24.12 g (0.259 mol) of β-picoline were successively added and reacted at 40° C. for 3 hours. After finishing the reaction, reaction mixture was diluted to 10%, successively washed with a 30% aqueous hydrogen chloride solution and water, and concentrated in an evaporator to remove methylene chloride. Polyesterdiol (k) thus obtained had a weight average molecular weight of 30,000 and a molecular weight distribution degree of 3.0. By repeating the same procedures as above except the amount of 1,4-butanediol was varied to 0.43 g and 0.347 g, respectively, polylactic acid modified polyesterdiol having a weight average molecular weight of 65,000 (l) and 78,000 (m), respectively, was obtained.

Examples 1 to 4

Into a 200 ml flask, 100 g of polylactic acid modified polyesterdiol (a) which was obtained in Synthesis Example 1 and had a weight average molecular weight of 3,000, was charged, heated and melted. A stoichiometric amount, that is, 19.8 g (0.096 mol) of NBDI was slowly added over 30 minutes and maintained as such for an hour to obtain degradable polyurethane resin (hereinafter referred to as polyurethane resin) having a melting point of 170° C.

In Examples 2 to 4 and Comparative Example 1 below, polyurethane resins were prepared by using polyesterdiol had a weight average molecular weight of 5,000 (polyol (b) in Example 2), 10,000 (polyol (c) in Example 3), and 20,000 (polyol (d) in Example 4), respectively. Any polyurethane resin prepared in Examples 1 to 4 had a weight average molecular weight of 100,000 or more. The amount of NBDI was 0.5 mol times of the number of hydroxyl group in polyol. Polyurethane resin obtained was formed into a film having a thickness of 100 μm and properties of the film were measured. Properties of the resin are shown in Table 1.

Example 5

Into a flask, 50 g of polylactic acid modified polyesterdiol (a) which was obtained in the same procedure as Synthesis Example 1 and had a weight average molecular weight of 3,000, and an equivalent amount of NBDI isocyanurate compound were charged, heated under nitrogen stream, and melted with stirring for an hour. The reaction mass was discharged on a stainless steel plate under nitrogen stream to obtain polyurethane resin. Properties of the polyurethane resin are shown in Table 1.

Example 6

The same procedures as Example 5 were carried out except NBDI urethondion compound was used as a NBDI modified compound. Polyurethane resin was obtained. Properties of the polyurethane resin obtained are shown in Table 1.

Example 7

The same procedures as Example 5 were carried out except NBDI biuret compound was used as a NBDI modified compound. Properties of polyurethane resin obtained are shown in Table 1.

Example 8

The procedures of Example 5 were repeated except NBDI trimethylolpropane adduct compound was used as a NBDI modified compound. Properties of polyurethane resin obtained are shown in Table 1.

Example 9

The procedures of Example 5 were repeated by using NBDI carbodiimide compound having average repeating units of 5. Properties of polyurethane resin obtained are shown in Table 1.

A test specimen obtained by fusion molding of the polyurethane resin at 240° C. had heat distortion temperature of 171° C., which was good resistance to heat as biodegradable resin.

Example 10

After melting 100 g of polylactic acid modified polyesterpolyol(e) which was obtained in Synthesis Example 2 and had an weight average molecular weight of 3,000 by heating to 200° C. NBDI was dropwise added over 30 minutes. NBDI was used in a stoichiometric amount to the hydroxyl group of polylactic acid modified polyesterpolyol. After mixing for an hour, the reaction mass was discharged on a stainless steel plate under nitrogen stream to obtain polyurethane resin. A press-film was prepared and properties are shown in Table 1.

Example 11

Procedures of Example 10 were repeated by using polylactic acid modified polyesterpolyol which was obtained in Synthesis Example 2 and had a weight average molecular weight of 5,000. Properties of polyurethane resin thus obtained are shown in Table 1.

Example 12

Procedures of Example 10 were repeated by using polylactic acid modified polyesterpolyol which was obtained in Synthesis Example 2 and had a weight average molecular weight of 10,000. Properties of polyurethane resin obtained are shown in Table 1.

Example 13

Procedures of Example 10 were repeated by using polylactic acid modified polyesterpolyol which was obtained in Synthesis Example 2 and had a weight average molecular weight of 20,000. Properties of polyurethane resin obtained are shown in Table 1.

Comparative Example 1

After dissolving 100 g of polylactic acid having a number average molecular weight of 1,500 into 300 g of benzene, 13.52 g (0.08 mol) of DMC and 17.88 g (0.192 mol) of β-picoline were charged, stirred for several minutes and allowed to stand for 2 hours.

The reaction mixture was diluted to 10% concentration, washed successively with a 30% aqueous hydrochloric acid solution and water, poured into a large amount of isopropyl alcohol, filtered and dried to obtain polylactic acid powder. The polylactic acid powder had a weight average molecular weight of 193,000. The molecular weight was sufficiently high for confirming properties. Specimens were prepared from the polylactic acid powder and properties were measured and shown in Table 1. According to the results, any polylactic acid-base polyurethane resin prepared in Examples 1 to 13 have improved mechanical properties as compared with polylactic acid prepared in Comparative Example 1. Biodegradability is almost equal. The polymer sheet prepared from polylactic acid of Comparative Example 1 had no flexibility and was broken by 180 degree bending.

Comparative Example 2

Polylactic acid modified polyesterdiol obtained in Synthesis Example I and had a weight average molecular weight of 10,000 was used. After charging and heat-melting 100 g of the polyesterdiol, 2.44 g of hexamethylene-diisocyanate was added and stirred for an hour. Viscosity increased rapidly, but gelation did not occur. After finishing the reaction, the reaction mass was discharged into a stainless steel plate to obtain polyurethane resin. Properties of polyurethane resin thus obtained was measured and shown in Table 1. According to the results, polyurethane resin of Example 4 has more excellent mechanical properties and almost equal biodegradability as compared with polyurethane resin of Comparative Example 2.

Comparative Example 3

Polylactic acid modified polyesterdiol(c) obtained in Synthesis Example 1 and had a weight average molecular weight of 10,000 was used. To a flask, 100 g of the polyesterdiol(c) was charged, melted by heating and 3.98 g of isophorone diisocyanate was added and stirred for 1 hour. Viscosity increase was slow and similar molecular weight as Example 4 could not be obtained even after stirring for 6 hours. That is, reaction velocity was very slow. After finishing the reaction, the reaction mass was discharged to a stainless steel plate to obtain polyurethane resin. Test specimen was prepared by forming polyurethane resin thus obtained. Results of testing properties are shown in Table 1. According to the results, polyurethane resin of Example 4 has more excellent mechanical properties and almost equal biodegradability as compared with polyurethane resin obtained in Comparative Example 3. Polymer sheet prepared from polyurethane resin obtained in Comparative Example 3 had poor flexibility and was broken by 180 degree bending.

Biodegradability

Biodegradability of polyurethane resin prepared in Examples 1 to 13 and Comparative Examples 1 to 3 was measured in accordance with ISO/CD 14855. Results are shown in Table 1.

Tensile Test

Tensile test of biodegradable resin obtained in Examples 1 to 13 and Comparative Examples 1 to 3 was carried out in accordance with JIS K-7113. Results are shown in Table 1.

TABLE 1

|  | Biodegradability | Mechanical Property | | |
| --- | --- | --- | --- | --- |
|  | Degradation after 3 month | Tensile strength MPa | Elongation % | Elastic modulas MPa |
| Example 1 | 84 | 68 | 44 | 4110 |
| Example 2 | 81 | 66 | 32 | 4800 |
| Example 3 | 83 | 68 | 22 | 4230 |
| Example 4 | 82 | 70 | 21 | 4390 |
| Example 5 | 80 | 77 | 18 | 6450 |
| Example 6 | 83 | 66 | 17 | 4690 |
| Example 7 | 84 | 67 | 61 | 4120 |
| Example 8 | 82 | 68 | 33 | 4270 |
| Example 9 | 79 | 72 | 11 | 4290 |
| Example 10 | 83 | 69 | 28 | 4430 |
| Example 11 | 81 | 70 | 27 | 4240 |
| Example 12 | 85 | 73 | 30 | 4480 |
| Example 13 | 84 | 73 | 32 | 4650 |
| Comparative Example 1 | 85 | 65 | 7 | 3380 |
| Comparative Example 2 | 83 | 39 | 35 | 3480 |
| Comparative Example 3 | 82 | 48 | 5 | 2130 |

Example 14

To a 1 liter separable flask equipped with a stirrer, fractionation condenser, thermometer and nitrogen inlet tube, 400 g of polyester (i) obtained in Synthesis Example 3 and 100 g of polyester (j) were charged, uniformly heat-melted and evacuated to 1 torr for 10 minutes. Thereafter 9.09 g of NBDI was added under ambient pressure at 200° C. in nitrogen stream. Viscosity increased rapidly, but gelation did not occur. Stirring was continued for 30 minutes and the reaction mass was discharged on a stainless steal plate. The polyurethane resin obtained was hot-pressed to form a press film having thickness of 100 μm. The film was tough and could not be broken by human force.

A transparent film obtained by stretching 3 times to both directions had tensile strength of 75 MPa.

Example 15

To a 1 liter flask equipped with a stirrer, fractionation condenser, nitrogen inlet tube and thermometer, 300 g (3.33 mol) of 1,4-butanediol and 354 g (3.00 mol) of succinic acid were charged and esterified at 200 to 205° C. for 5 hours in a nitrogen stream. Successively, the condenser was changed to a straight run type, 0.06 g of tetraisopropyl titanate was added, and deglycolation reaction was carried out at 220° C. under reduced pressure of 0.05 torr for 10 hours. The reaction mass was discharged on a stainless steel plate. Polyesterdiol thus obtained was a crystalline product and solidified to white, opaque hard wax. The wax had a weight average molecular weight of 38,000, acid value of $1.02\times10^{-5}$ mol/g, and hydroxyl value of $5.88\times10^{-5}$ mol/g. To a 300 ml flask equipped with a stirrer, condenser, nitrogen inlet tube and thermometer, 100 g ($5.88\times10^{-3}$ mol as hydroxyl group) of aliphatic polyesterdiol thus obtained was charged, melted at 180° C. and 0.77 g of NBDI was added. Viscosity increased rapidly, but gelation did not occur. Thereafter the reaction was continued for an hour and finished. The obtained polyurethane resin was hot-pressed into a film and properties were measured. The film had good mechanical properties. Tensile strength at break was 68 MPa and elongation at break was 490%.

Example 16

To a 100 ml four necked flask, 14.6 g (0.10 mol) of adipic acid, 9.2 g of 1,4-butanediol, 0.3 g of DL-maleic acid, 0.05 g of methanesulfonic acid and 40 ml of toluene were charged, and a dehydration condensation reaction was carried out at 100 to 110° C. for 7 hours. The reaction product had a number average molecular weight of 16,000 and a weight average molecular weight of 37,000 by GPC. Hydroxyl value was $1.41\times10^{-4}$ mol/g. Thereafter, 0.32 g of NBDI was added and reacted at 100° C. for 4 hours. At this stage, the reaction mass had a weight average molecular weight 161,000. After finishing the reaction, toluene and methanesulfonic acid were removed to obtain modified polybutylene adipate.

Example 17

To a flask, 200 g of xylene and 50 g of polylactic acid modified polyesterdiol(c) which was obtained in Synthesis Example 1 and had a weight average molecular weight of 10,000 were charged and dissolved at 100° C. Thereafter, 1.85 g ($8.95\times10^{-3}$ mol) of NBDI and 10 mg of 1,4-diaza[2.2.2]bicyclooctane were added and reacted for 2 hours. Successively, 10 mg of 3-methyl-1-phenyl-3-phosphoren oxide which is a carbodiimide catalyst was added and reacted at 120° C. for 20 hours. After finishing the reaction, the reaction mixture was cooled, filtered, washed with 500 ml of methyl-tert-butyl ether, and dried under reduced pressure at 80° C. for 12 hours to obtain degradable polyurethane carbodiimide resin. The resin was hot-pressed at 240° C. to form a sheet having a thickness of 3 mm. The sheet had a Vicat softening point of 174° C. in accordance with JIS K-7206.

Example 18

To a flask, 40 g of cellulose acetate having a weight average molecular weight of 110,000, 60 g of polylactic acid modified polyesterpolyol(a) which was obtained in Synthesis Example 1 and had a molecular weight of 5,000, and 300 g of xylene were charged and dissolved at 120° C. Thereafter, 1 g of 1% xylene solution of 1,4-diaza[2.2.2]bicyclooctane was added, and successively 11.8 g(0.057 mol) of NBDI was charged. Reaction was carried out for 1 hour. After finishing the reaction, the reaction mixture was cooled, filtered, washed with 800 g isopropyl alcohol and dried at 80° C. under reduced pressure to obtain polyurethane resin powder.

The press film prepared from the resin had a tensile strength at break of 69 MPa, elongation of 260% and tensile elastic modulus of 3,920 MPa.

Example 19

After heat-melting 100 g of polylactic acid modified polyesterdiol(k) which was obtained in Synthesis Example 4 and had a weight average molecular weight of 30,000, a stoichiometric amount of NBDI was added and maintained for an hour to obtain polyurethane resin. The polymer thus obtained was kneaded in an extruder and delivered through a T-die in the form of an unstretched film having a thickness of 800 μm. Properties of the film are shown in Table 2.

Example 20

The procedures of Example 19 were repeated except polylactic acid modified polyesterdiol (l) having a weight average molecular weight of 65,000 in Synthesis Example 4 was used. Properties of a film obtained are shown in Table 2.

Example 21

The same procedures as Example 19 were carried out by using polylactic acid modified polyesterdiol(m) having a weight average molecular.weight of 78,006 in Synthesis Example 4. Properties of the film thus obtained are shown in Table 2.

Example 22

The procedures of Example 19 were repeated except polylactic acid modified polyesterdiol (l) having a weight average molecular weight of 65,000 in Synthesis Example 4 and polybutylene succinate having a weight average molecular weight of 50,000 were used in a proportion of 90:10. Properties of the film obtained are shown in Table 2.

Example 23

The procedures of Example 19 were repeated except polylactic acid modified polyesterdiol having a weight average molecular weight of 78,000 in Synthesis Example 4 and polybutylene succinate having a weight average molecular weight of 50,000 were used in a proportion of 80:20. Properties of the film are shown in Table 2.

TABLE 2

| Example | Mw of X | Proportion (X:Y) | Strength of break MPa |
| --- | --- | --- | --- |
| Example 19 | 10,000 | 100:0 | 64 |
| Example 20 | 65,000 | 100:0 | 69 |
| Example 21 | 78,000 | 100:0 | 73 |
| Example 22 | 65,000 | 90:10 | 77 |
| Example 23 | 78,000 | 80:20 | 82 |

Note;
MW: weight average molecular weight
X: polylactic acid modified polyesterdiol
Y: polybutylene succinate Example 24

Polyurethane resin was prepared by repeating the procedures of Example 19 except polylactic acid modified polyesterdiol having a weight average molecular weight of 30,000 in Synthesis Example 4 was used. The polyurethane resin obtained was melt-kneaded with an extruder to form an unstretched sheet having a thickness of 1.2 mm. The polymer sheet thus obtained did not break even after repeating 100 times of 180 degree bending and also had good flexibility.

Example 25

Procedures of Example 24 were repeated except polylactic acid modified polyesterdiol (l) having a weight average molecular weight of 65,000 in Synthesis Example 4 was used. The polymer sheet obtained did not break, even after repeating 100 times of 180 degree bending and also had good flexibility.

Example 26

Procedures of Example 24 were repeated except polylactic acid modified polyesterdiol (m) having a weight average molecular weight of 78,000 in Synthesis Example 4 was used. The polymer sheet obtained broke after repeating 89 times of 180 degree bending. Flexibility was good.

Example 27

Procedures of Example 24 were repeated except polylactic acid modified polyesterdiol (l) having a weight average molecular weight of 65,000 in Synthesis Example 4 and polybutylene succinate having a weight average molecular weight of 50,000 were used in a proportion of 90:10.

Example 28

Procedures of Example 24 were repeated except polylactic acid modified polyesterdiol (m) having a weight average molecular weight of 78,000 in Synthesis Example 4 and polybutylene succinate having a weight average molecular weight of 50,000 were used in a proportion of 80:20.

Example 29

Polyurethane resin was prepared by the same procedures as Example 19. The polymer obtained was melt-spun with a nozzle mounted extruder to obtain a filament for use in staple fiber. Properties of the staple filament obtained are shown in Table 3.

Example 30

Polyurethane resin was prepared by the same procedures as Example 20. The polymer obtained was melt-spun with a nozzle mounted extruder to obtain a filament for use in staple fiber. Properties of the filament obtained are shown in Table 3.

Example 31

Polyurethane resin was prepared by the same procedures as Example 21. The polymer obtained was melt-spun with a nozzle-mounted.extruder to obtain a filament for use in staple fiber. Properties of the filament obtained are shown in Table 3.

TABLE 3

| Example | Mw of X | Melting temperature ° C. | Tensile elongation % |
| --- | --- | --- | --- |
| Example 29 | 10,000 | 175 | 30 |
| Example 30 | 65,000 | 172 | 40 |
| Example 31 | 78,000 | 173 | 40 |

Note,
MW: weight average molecular weight
X: polylactic acid modified polyesterdiol
Y: polybutylene succinate Example 32

A rotor was mounted on a screw tube, and 1 g of the polyurethane resin powder obtained in Examples 1 to 18 and 20 g of a 10 N aqueous sodium.hydroxide solution were charged and stirred with a magnetic stirrer at room temperature to 50° C. Any powder was dissolved into water within an hour. Any polyurethane resin had good hydrolyzability.

Probability of Application in Industry

The degradable polyurethane resin of the invention is prepared by using an isocyanate bonding agent; 2,5-/2,6-diisocyanatomethylbicyclo[2.2.1]heptane and/or a modified compound thereof.

The resin is a polyurethane-base material having degradability that is, hydrolyzability and biodegradability. After using for a desired object, the resin can be hydrolyzed to recover and reuse the raw material. That is, recycled use can be accelerated even in the field of difficulty recycled matter such as printed paper combined with a general purpose resin. For example, paper or card laminated with the polyurethane resin of the invention can be recovered and recycled without isolating from other general-purpose paper. When compared with conventionally known biodegradable resin, the resin of the invention has new combination of properties such as rigidity and elasticity and flexibility in addition or outstandingly high elasticity and elongation notwithstanding high strength. Further, the polyurethane resin of the invention can provide formed-articles having biodegradability.

Consequently, the polyurethane resin of the invention has become capable of applying to a field where conventional biodegradable resin was unsatisfactory in view of physical properties although biodegradability was good.

The polyurethane resin of the invention can be obtained without heavy load in production as compared with biodegradable resin prepared by using conventionally known aliphatic diisocyanate as a bonding agent. Further, diamine which generates after degradation has no mutagenicity and thus a biodegradable resin having safety and high adaptability to environment can be provided.

What is claimed is:

1. A degradable polyurethane resin resulting from reaction of polyol with 2,5/2,6-diisocyanatomethylbicyclo[2.2.1]heptane represented by the formula (1):

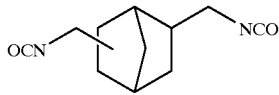

(1)

wherein the two isocyanatomethyl groups are located on 2,5-positions or 2,6-positions or a mixture thereof, and/or a modified compound thereof, wherein the polyol is (A) polyhydroxycarboxylate polyol wherein the polyhydroxycarboxylate polyol is obtained by modification of the terminal carboxyl group to a hydroxyl group in the aliphatic polyhydroxycarboxylic acid represented by the formula (2):

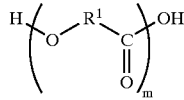

(2)

wherein $R^1$ is an alkylene group having 1 to 4 carbon atoms in the straight chain portion and having 1 to 6 total carbon atoms which include branched alkyl groups, and m is an integer of 1 or more, or a mixture or copolycondensate of (A) and one or more compounds selected from (B) aliphatic polyesterpolyol and (C) saccharides.

2. A degradable polyurethane resin according to claim 1 wherein $R^1$ in the formula (2) is an alkylene group having 1 carbon atom, alkylene having 1 carbon atom in the straight chain portion and substituted by methyl, ethyl or propyl, or having 2 carbon atoms in the straight chain portion and substituted by methyl or ethyl, or having 3 carbon atoms in the straight chain portion and substituted by methyl, and $R^1$ in the formula (2) is aliphatic polyhydroxycarboxylate polyol comprising the same or different structural units.

3. A degradable polyurethane resin according to claim 1 wherein aliphatic polyesterpolyol is obtained by reacting a single compound or mixture selected from aliphatic polyhydric alcohol represented by the formula (3):

wherein $R^2$ is an unsubstituted or substituted aliphatic hydrocarbon group having 2 to 20 carbon atoms, with a single compound or mixture selected from aliphatic polybasic acid represented by the formula(4):

wherein $R^3$ is an unsubstituted or substituted aliphatic hydrocarbon group having 2 to 20 carbon atoms.

4. A degradable polyurethane resin according to claim 1 wherein saccharides are a single compound or mixture selected from monosaccharide, molasses, cellulose or cellulose derivative.

5. A degradable polyurethane resin according to claim 1 wherein the polyol has acidity of $10^{-4}$ mol/g or less.

6. A degradable polyurethane resin according to claim 1 wherein the modified compound of 2,5-/2,6-diisocyanatomethylbicyclo[2.2.1]heptane is a single compound or a mixture selected from the group consisting of isocyanurate derivative of 2,5- and/or 2,6-diisocyanatomethylbicyclo[2.2.1]heptane represented by the formula(6):

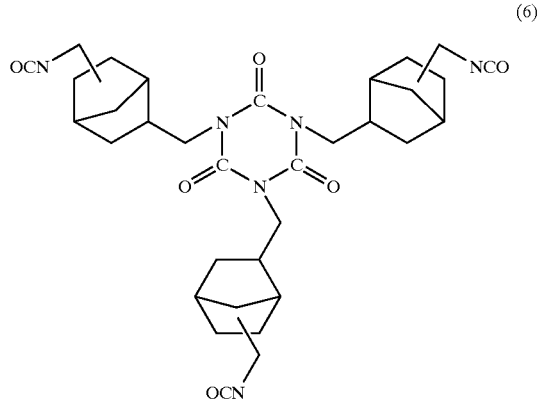

(6)

or a blocked compound thereof; uretidione derivative of 2,5- and/or 2,6-diisocyanatomethylbicyclo[2.2.1]heptane represented by the formula(7):

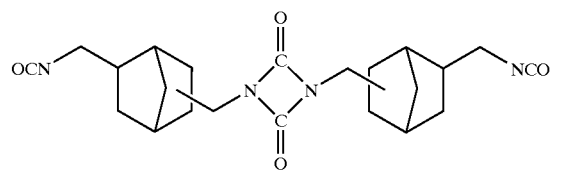

(7)

or a blocked compound thereof; biuret derivative of 2,5- and/or 2,6-diisocyanatomethylbicyclo[2.2.1]heptane represented by the formula(8):

(8)

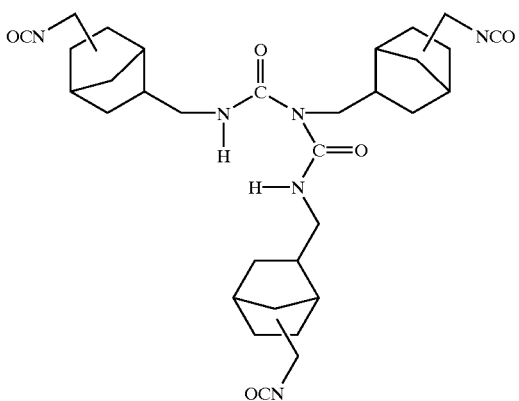

or a blocked compound thereof; trimethylolpropane adduct of 2,5- and/or 2,6-diisocyanatomethylbicyclo[2.2.1]heptane represented by the formula(9):

(9)

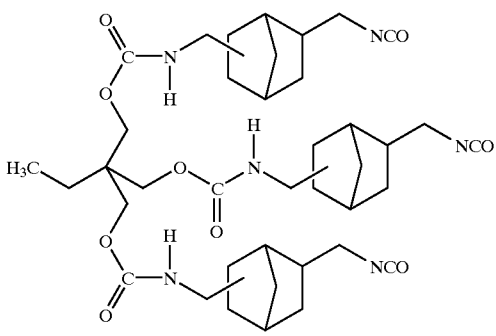

or a blocked compound thereof; and polycarbodiimide derivative of 2,5- and/or 2,6-diisocyanatomethylbicyclo[2.2.1]heptane represented by the formula(10):

(10)

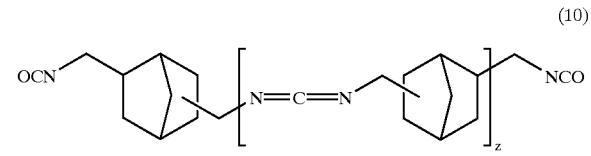

wherein Z is an integer of 1 or more.

7. A degradable polyurethane resin according to claim 1 wherein 2,5-/2,6-diisocyanatomethylbicyclo[2.2.1]heptane and/or a modified compound thereof are used in an amount of 0.001 to 40% by weight for total amount of raw materials used in the reaction.

8. A hydrolyzable polyurethane resin according to claim 1.

9. A biodegradable polyurethane resin according to claim 1.

10. A raw material composition of degradable polyurethane resin characterized by comprising the polyol of claim 1 and 2,5/2,6-diisocyanatomethylbicyclo[2.2.1]heptane and/or a modified compound thereof.

11. A polymer film comprising the degradable polyurethane resin of claim 1.

12. A polymer sheet comprising the degradable polyurethane resin of claim 1.

13. A base material for disk case comprising the degradable polyurethane resin of claim 1.

14. A polymer staple comprising the degradable polyurethane resin of claim 1.

15. A card base comprising the degradable polyurethane resin of claim 1.

* * * * *